(12) United States Patent
Diao et al.

(10) Patent No.: US 7,346,401 B2
(45) Date of Patent: Mar. 18, 2008

(54) SYSTEMS AND METHODS FOR PROVIDING CONSTRAINED OPTIMIZATION USING ADAPTIVE REGULATORY CONTROL

(75) Inventors: Yixin Diao, White Plains, NY (US);
Christian Marcelo Garcia-Arellano, Ontario (CA); Joseph L. Hellerstein, Ossining, NY (US); Sam Sampson Lightstone, Ontario (CA); Sujay Sunil Parekh, New York, NY (US); Adam J. Storm, Ontario (CA); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 10/853,845

(22) Filed: May 25, 2004

(65) Prior Publication Data
US 2005/0268063 A1    Dec. 1, 2005

(51) Int. Cl.
*G05B 13/02*    (2006.01)
(52) U.S. Cl. .............................. 700/28; 700/29; 700/37; 700/51; 700/53
(58) Field of Classification Search ............ 700/28–29, 700/32, 36–37, 44–45, 51, 53; 711/118, 711/170
See application file for complete search history.

(56) References Cited
U.S. PATENT DOCUMENTS

| | | | |
|---|---|---|---|
| 5,675,790 A * | 10/1997 | Walls ........................ 707/205 |
| 6,061,763 A * | 5/2000 | Rubin et al. ................. 711/129 |
| 6,253,226 B1 * | 6/2001 | Chidambaran et al. ..... 718/104 |
| 6,401,181 B1 * | 6/2002 | Franaszek et al. .......... 711/170 |
| 6,539,464 B1 * | 3/2003 | Getov ......................... 711/170 |
| 6,804,761 B1 * | 10/2004 | Chen et al. ................. 711/170 |
| 6,832,303 B2 * | 12/2004 | Tanaka ........................ 711/173 |
| 7,017,020 B2 * | 3/2006 | Herbst et al. ............... 711/167 |
| 7,194,495 B2 * | 3/2007 | Moir et al. .................. 707/206 |
| 2003/0212873 A1 * | 11/2003 | Lee et al. .................... 711/170 |
| 2004/0193775 A1 * | 9/2004 | Van Doren et al. ............ 711/1 |
| 2005/0060510 A1 * | 3/2005 | Perez ......................... 711/170 |
| 2005/0154851 A1 * | 7/2005 | Charles ....................... 711/170 |
| 2006/0236064 A1 * | 10/2006 | Niles et al. ................. 711/170 |
| 2007/0150683 A1 * | 6/2007 | Chang et al. ............... 711/165 |
| 2007/0156931 A1 * | 7/2007 | Bilak et al. ................... 710/52 |

* cited by examiner

*Primary Examiner*—Ronald Hartman, Jr.
(74) *Attorney, Agent, or Firm*—F. Chau & Associates, LLC

(57) ABSTRACT

Systems and methods are provided for optimizing the performance and/or allocation of constrained resources in a dynamic computing environment using adaptive regulatory control methods. For example, systems and methods for providing constrained optimization in a dynamic computing system implement model-based adaptive (self-tuning) regulatory control schemes that are designed to handle the system dynamics and which take into consideration control costs (such as the overheads of changing resource allocations and performance degradation due to transient load imbalances) to find an optimal solution. To facilitate practical application, a dual control architecture is disclosed which combines a heuristic fixed step control process that is implemented when there is no valid system model for model-based control. A system model is continually obtained and validated during run-time to adapt control parameters to variations in system dynamics.

36 Claims, 7 Drawing Sheets

US 7,346,401 B2

SYSTEMS AND METHODS FOR PROVIDING CONSTRAINED OPTIMIZATION USING ADAPTIVE REGULATORY CONTROL

TECHNICAL FIELD OF THE INVENTION

The present invention relates generally to performance and systems management for providing online optimization under constraint in a dynamic on-demand computing environment and, in particular, systems and methods for implementing adaptive regulatory control in a dynamic computing environment for optimizing the performance and/or utilization of constrained resources in the dynamic computing environment.

BACKGROUND

A primary concern of businesses with mission critical computing is quality of service or the ability to manage computing resources so as to minimize response times and maximize throughputs. Constrained optimization techniques are widely used in computing systems for optimal resource allocation, such as allocating servers in a server farm to improve system throughputs or adjusting the size of memory pools to reduce delays in a database management system.

Generally, constrained optimization has been implemented using techniques such as constraint programming (D. G. Luenberger, *Linear and Nonlinear Programming*, Addison-Wesley, Reading, Mass., 1984), genetic algorithms (T. L. Lau, et al., *The Guided Genetic Algorithm and its Application to the Generalized Assignment Problem*, Proceedings of the Tenth IEEE International Conference on Tools with Artificial Intelligence, Taipei, Taiwan, pp. 336-343, 1998), and heuristic search (P. Dasgupta, et al., *Solving Constraint Optimization Problems from CLP-style Specifications Using Heuristic Search Techniques*, IEEE Transactions on Knowledge and Data Engineering, pp. 353-368, 2002).

Unfortunately, none of the above approaches takes into consideration the dynamics of computing systems such as the delay of control actions of adjusting configuration parameters, and the overheads of adjusting these configuration parameters (i.e., the cost of control actions). With the growth of the Internet, the dynamics of on-demand computing systems have become increasingly important, especially with respect to "flash events" that can cause very rapid, dramatic changes in workloads, requiring prompt control actions which result in control delay and control costs that are not negligible.

On the other hand, the control literature contains extensive studies of dynamic systems with constraints in which optimization is performed (see, e.g., M. Athans, et al., *Optimal Control: An Introduction to the Theory and its Applications*, McGraw-Hill Book Company, New York, 1966; S. Lyashevskiy, *Control of linear dynamic systems with constraints: optimization issues and applications of nonquadratic functionals*, Proceedings of the 35th IEEE Conference on Decision and Control, Kobe, Japan, pp. 3206-3211, 1996; A. S. Matveev, *Application of linear-quadratic control theory to the solution of special nonconvex problems of global constrained optimization*, Proceedings of the American Control Conference, Seattle, Wash., pp. 3928-3932, 1995; J. A. Rossiter, et al., *Feasibility and stability for constrained stable predictive control*, Proceedings of the Third IEEE Conference on Control Applications, Glasgow, UK, pp. 1885-1890, 1994).

With these techniques, however, the control objective is typically regulation or tracking (but not optimizing resource allocations), and the optimization technique is only applied to control performance indexes (e.g., minimize a tracking error).

Several related patents have been issued which disclose methods for constrained optimization of dynamic systems. For instance, U.S. Pat. No. 5,381,361, entitled: Method and Apparatus for Real-Time Constraint Solution, describes conducting gradient descent techniques with analog VLSI so that the constraint solution can be performed continually in real time without the limitations of discrete optimization as implemented using digital processing. Moreover, U.S. Pat. No. 5,761,381, entitled: Computer System Using Genetic Optimization Techniques, describes methods for integrating genetic and other optimization techniques, which include genetic, simulated annealing, constraint logic, and neural networks and are interacted for synergy solutions.

However, it is believed that the known control solutions have not addressed the challenges of handling dynamics of constrained optimization systems.

SUMMARY OF INVENTION

In general, exemplary embodiments of the invention include systems and methods for optimizing the performance and/or allocation of constrained resources in a dynamic computing environment using adaptive regulatory control methods. More specifically, exemplary embodiments of the invention include systems and methods for providing constrained optimization in a dynamic computing system, which implement model-based adaptive (self-tuning) regulatory control schemes that are designed to handle the system dynamics and which take into consideration control costs (such as the overheads of changing resource allocations and performance degradation due to transient load imbalances) to find an optimal solution.

In one exemplary embodiment of the invention, a method for managing resources in a dynamic computing system comprises: determining a performance metric value for each of a plurality of resource consumers of a target system; determining a control reference value as an average of the performance metric values of the resource consumers; determining a control error for each resource consumer as a difference between the performance metric value of the resource consumer and the control reference value; and controlling the target system using a control method that optimizes resource allocations for the resource consumers by minimizing the control errors subject to a constraint.

In one exemplary embodiment, the target system can be controlled using a model-based feedback controller which generates control inputs to control the resource consumers based on control parameters that are determined based on model parameters of a system model of the target system. The model-based feedback control method can be used for determining an optimal resource allocation for each of the resource consumers and then adjusting the resource allocation of the resource consumers based on the optimal resource allocations subject to the constraint that a total amount of the resource to be allocated among the resource consumers is fixed.

In one exemplary embodiment, the model based-feedback controller comprises a MIMO controller having controller parameters that are determined based on a linear MIMO model of the target system. A system model of the target system is built based on run-time values of control inputs and performance metrics that are collected for the resource consumers. In one exemplary embodiment, the MIMO controller is designed using LQR to determine controller gain parameters that take into consideration costs of control including a cost of transient load imbalances and a cost of changing resource allocations. The system model can be built and validated during run-time on a continual basis to adapt the MIMO controller parameters to variations in dynamics of the target system.

In another exemplary embodiment of the invention, a dynamic computing system comprises: a system resource; a target system comprising a plurality of resource consumers of the system resource; and a control system to control allocations of the system resource to the resource consumers using an adaptive regulatory controller that optimizes the resource allocations to the resource consumers subject to a constraint. In another embodiment, the system comprises a memory statistics collection system that determines a performance metric value for each resource consumer of the target system, wherein the control system optimizes the resource allocations to the resource consumers by equalizing the performance metric values of the resource consumers subject to the constraint that a sum of changes in resource allocations to the memory pools is equal to 0.

In one exemplary embodiment of the invention, the dynamic computing system is a database server comprising disks for storing data, the system resource is memory, and the resource consumers comprise memory pools that cache copies of data stored in the disks. The performance metric for a given memory pool can be defined as a measure of saved disk response time per unit memory increase of the memory pool.

In another exemplary embodiment of the invention, the control system further comprises a model building process that continually builds a system model of the target system based on run-time input/output data of the target system for implementation by the adaptive regulatory controller, and a model validation process that determines if a system model is valid before implementation by the adaptive regulatory controller.

In yet another exemplary embodiment of the invention, the control system comprise a dual-control architecture including the adaptive regulator controller for model-based control and a heuristic controller that adjusts resource allocations for the resource consumers in fixed increments subject to the constraint. The control system uses the heuristic controller when there is no valid system model for implementation by the adaptive regulatory controller for model-based control.

These and other exemplary embodiments, aspects, features and advantages of the present invention will be described or become apparent from the following detailed description of exemplary embodiments, which is to be read in connection with the accompanying drawings.

DETAILED DESCRIPTION OF EXEMPLARY EMBODIMENTS

Exemplary embodiments of the invention as described herein generally include systems and methods for implementing adaptive regulatory control for optimizing the performance and/or utilization of constrained resources in a dynamic computing environment. More specifically, exemplary embodiments of the invention include systems and methods for conducting online constrained optimization using model-based adaptive regulatory control schemes that take into consideration system dynamics and control costs.

For illustrative purposes, exemplary embodiments of the invention will be described with specific reference to load balancing control systems and methods for providing constrained optimization of memory allocations in a database management system, wherein the load balancing control systems and methods are implemented using a model-based adaptive regulatory control framework which considers the "cost of control" (e.g., cost of transient load imbalances and the cost of changing resource allocations), for dynamically adjusting the size of buffer and other memory pools in the database management system. It is to be understood, however, that the present invention is not limited to any particular computing system environment. Rather, the invention is more generally applicable to any dynamic computing environment in which it would be desirable to conduct online constrained optimization where system dynamics are not negligible.

It is to be understood that the systems and methods described herein in accordance with the present invention may be implemented in various forms of hardware, software, firmware, special purpose processors, or a combination thereof. Preferably, the present invention is implemented in software comprising program instructions that are tangibly embodied on one or more program storage devices (e.g., hard disk, magnetic floppy disk, RAM, CD ROM, DVD, ROM and flash memory), and executable by any device or machine comprising suitable architecture.

It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
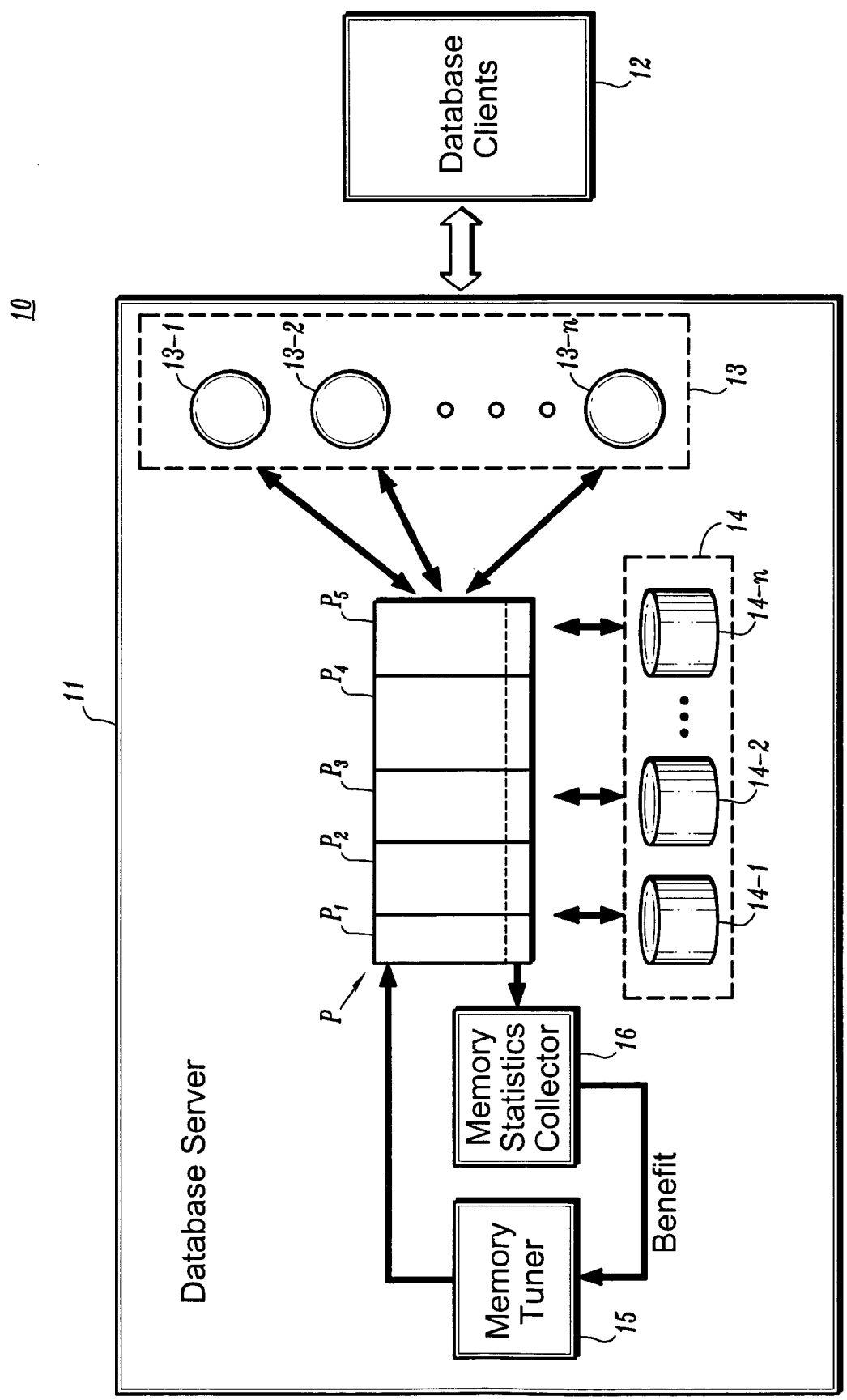
FIG. 1 is a schematic block diagram of a dynamic data processing system that implements a control system for optimizing the performance and/or utilization of constrained resources, according to an exemplary embodiment of the invention.

FIG. 1 is a schematic block diagram of a dynamic data processing system that implements a control system for optimizing the performance and/or utilization of constrained resources, according to an exemplary embodiment of the invention. More specifically, FIG. 1 depicts a database server system (10) comprising a database server (11) that processes query requests by a plurality of database clients (12) for information on disk and serves the database clients (12) through database agents (13-1, 13-2, 13-3, . . . , 13-$n$) (generally denoted (13)). The database server (11) comprises a plurality of disks (14-1, 14-2, 14-3, . . . , 14-$n$) (generally denoted (14)) to persistently store a large amount of data. The disks (14) can be of various types and characteristics, as is known in the art.

The database agents (13) are computing elements that access copies of disk data through a plurality of memory pools ($P_1$~$P_5$) (or more generally denoted P). The memory pools (P) are used to cache disk pages to reduce the number of disk input/output operations for the agents (13). The memory pools (P) can be of different types and characteristics, including, for example, buffer pools, sort, and package cache. In the exemplary embodiment of FIG. 1, it is assumed that the total size of the memory pools (P) is fixed (i.e., size of resource (memory pools) is constrained (fixed total size)).

For a dynamic computing system such as the database server system (10), it is important to implement methods to effectively manage/control the utilization of computing resources, such as memory pool allocations, so as to obtain sufficient database system response times and throughputs. Indeed, in the database server system (10) of FIG. 1, the response time to access disk data can be dramatically reduced by increasing the size of a memory pool since there is a higher probability that a copy of the data is cached in memory. With respect to the exemplary embodiments described herein for database memory management, the reduction in the system response time that is obtained from an increase in memory allocation is referred to a response time benefit (or alternatively, benefit), which is a measure of saved response time per unit memory increase (e.g., saved time (seconds)/page). As explained below, the response time benefit is one exemplary performance metric that can be measured and used for implementing a control strategy to optimize memory allocations in a database management system to provide optimal memory performance, although other performance metrics can be considered depending on the application and the control strategy.

The database server (11) comprises a memory tuner (15) which implements a load balancing control scheme according to an exemplary embodiment of the invention, for controlling memory allocations for the memory pools (P) in a manner that takes into consideration system dynamics and control costs. Since the workload can change over time, the memory tuner (15) redistributes the memory periodically at certain time intervals by determining (at each time interval and for each memory pool (P)), if an increase or decrease in size is necessary, and if so, the amount of memory that should be moved, based on the benefit values/metrics for the memory pools (P) that are obtained from a memory statistics collector (16). Since the total size of the memory pools (P) is fixed, increasing the size of one pool necessarily means decreasing the size of another pool. As discussed herein, various control schemes can be implemented by the memory tuner (15) to adjust the memory pool allocations with the intent of reducing overall response time for data access (i.e., the sizes of the memory pools are automatically adjusted to optimize performance) under a constraint that the total size of the memory pools (P) is fixed.

More specifically, in accordance with an exemplary embodiment of the invention, an objective of the memory tuner (15) for database memory management is to maximize the total saved system time over all memory pools (P), given the constraint the total memory size of memory pools (P) is fixed. In the exemplary database memory management embodiment where a measured output (performance metric) is the response time benefit (which is a derivative of saved disk response time with respect to memory pool size for each memory pool), an intuitive control strategy would be to allocate memory to the memory pools such that each memory pool has the same benefit. Such control strategy can be classified into a general class of control strategies known as "load balancing" for equalizing a measured system output so as to balance utilization of system resources.

Conventional load balancing control strategies typically use constrained optimization methods in which only the benefits of load balancing are considered. For example, given a system model, an optimal solution of a constrained optimization problem can be determined by using direct substitution of the constraint for a performance function or by using Lagrange multipliers. Moreover, the known Karush-Kuhn-Tucker optimality condition can also be used if, e.g., a memory pool is bounded by a minimum size. However, in many situations the model is generally unknown. Current approaches such as sequential quadratic programming which assumes local quadratic models and converges through iterative steps. With such conventional methods, however, load balancing does not consider the impact of transient load imbalances and the overheads of changing resource allocations. However, costs should be considered as well, especially in environments where workloads can change rapidly. Moreover, consideration should be given to system dynamics, the stochastic nature of the workload, and unexpected disturbances to the system.

In accordance with exemplary embodiments of the invention, control systems and methods are provided which incorporate the cost of control into load balancing for resource management in computing systems. In one exemplary embodiment of the invention, cost of control is a trade-off between two considerations. The first is the benefit obtained from load balancing, which can also be viewed as the cost of transient load imbalances. For example, a control strategy that slowly changes resource allocations may result in load imbalances over a substantial period of time that can impair performance. The second is the cost of changing resource allocations. For example, large changes in the size of buffer pools can reduce throughput because data must be written to disk. The term "cost of control" can refer to the combined effect of the cost transient load imbalances and the cost of changing resource allocations.

More specifically, in accordance with an exemplary embodiment of the invention, constrained optimization is provided using linear multi-input multi-output (MIMO) regulatory control to addresses system dynamics including costs of control. The dynamics of constrained optimization refers to the trajectory of resource allocations. There are two costs associated with this trajectory. The first is the cost of a sub-optimal resource allocation. A memory allocation with unbalanced response time benefit would result in longer system response time and less server throughput. The second cost is that of the control actions, such as changes in memory allocations, which consume resource and reduce throughput as well. As explained below, various methods for determining controller parameters can be implemented in which the controller gain parameters are computed in consideration of these costs of control.

Figure 2:
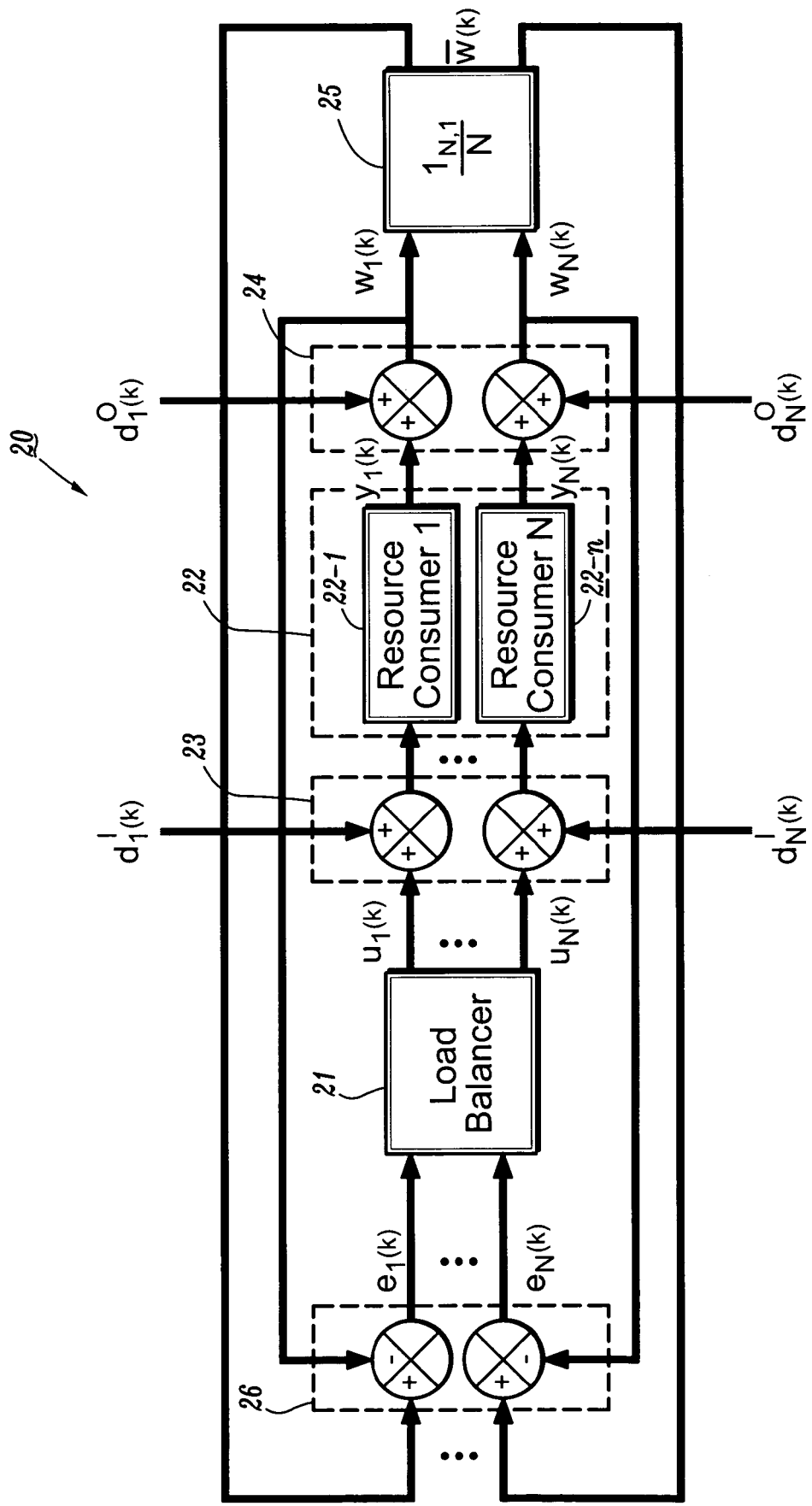
FIG. 2 is a schematic block diagram of a feedback control system and method for providing linear regulatory control according to an exemplary embodiment of the invention.

FIG. 2 is a general block diagram of feedback control system and method for providing linear regulatory control to implement constrained optimization of resources in a dynamic computing system, according to an exemplary embodiment of the invention. More specifically, FIG. 2 generally depicts a feedback control system (20) in which a load balancer (21) operates as a MIMO controller to control resource allocations for a target system ("plant") comprising a finite set of N resource consumers (22-1, . . . , 22-N) (generally denoted (22)). As explained hereafter, the control system (20) implements a control strategy that considers system dynamics such as the effects of disturbances (e.g., changes/variations in workload) and the cost of control actions (e.g., overhead for changing the sizes of the memory pools.)

In one exemplary embodiment of the invention, the load balancer (21) is a model-based MIMO controller that is designed based on a linear MIMO model of the target system (or plant). More specifically, the target system can be modeled as the set of N resource consumers (22-1, . . . , 22-N) with a plurality of control inputs $u_1(k), \ldots, u_N(k)$ (or more generally, $u_i(k)$), which are input to the respective resource consumers (22), and a plurality of system outputs $y_1(k), \ldots, y_N(k)$ (or more generally, $y_i(k)$), which are output from respective resource consumers (22), where k indicates a unit of discrete time.

Various techniques that are known to those of ordinary skill in the art of controller design can be used to determine the system model. One such technique known as "black-box" system identification may be used. System identification is a method which is commonly implemented in control system design to empirically determine a linear model of a target system based on a plurality of measured input/output pairs, from which system model parameters can be derived using a least squares method. More specifically, with black-box modeling, a discrete time model can be selected and the parameters of such model are estimated by fitting the input-output data.

As noted above, in an exemplary embodiment of database memory management, a memory tuning objective is to equalize a common performance metric, e.g., saved response time per unit memory increase (e.g., seconds/page), which as noted above is referred to as the response time benefit (or reduction in response time to access disk data due to increase in memory allocation). In the exemplary database memory management embodiment, for each memory resource consumer (22), a nonlinear relationship exists between the saved system time for a given memory resource consumer, denoted $z_i$ and the memory size, $u_i$, for the given consumer, i.e., $z_i = f_i(u_i)$, wherein $f_i$ is a function of the nonlinear relationship for the i-th memory resource consumer. Generally, $f_i$ is a non-decreasing function since increasing the size of a memory pool would allow more disk data to be cached in the memory so that the system time (e.g., disk I/O time for buffer pool or CPU time for sort) can be saved. The tuning objective can be defined as a constrained optimization for maximizing the total saved response time Z over all memory resource consumers, N, given the constraint that the total memory size U is fixed. In other words, for a total of N resource consumers, the total saved response time Z, which can be denoted as $$Z = \sum_{i=1}^{N} z_i \quad \text{or} \quad Z = f(u_1, u_2, \ldots, u_N) = \sum_{i=1}^{N} f_i(u_i),$$

is maximized subject to the constraint of the fixed size of the total available memory, $$U = \sum_{i=1}^{N} u_i.$$

In accordance with a constrained optimization theory (e.g., Karush-Kuhn-Tucker conditions), an optimal solution for the above tuning objective can be found when either all partial derivatives are equal:

$$\frac{\partial f}{\partial u_1} = \frac{\partial f}{\partial u_2} = \ldots = \frac{\partial f}{\partial u_N}$$

or when all derivatives are equal:

$$\frac{df_1}{du_1} = \frac{df_2}{du_2} = \ldots = \frac{df_N}{du_N},$$

which leads to the memory tuning objective of equalizing the common performance metric (e.g., response time benefit), since it is the derivative of the saved response time.

In accordance with an exemplary embodiment of the invention, a MIMO controller can be designed by first modeling the relationship between resource allocations and measured outputs, which in the exemplary embodiment for database memory management, is the relationship between memory pool sizes in the database server and the response time benefits. Although the relationship between memory pool size in a database server and the response time benefit is inherently non-linear, system identification can be used to approximate a local linear model in a desired operating region for modeling the underlying system dynamics. In other words, a linear model is used to model the relationship between the control inputs (memory resource allocations) and the measured system outputs (response time benefits)

In one exemplary embodiment of the invention as depicted in FIG. 2, two types of disturbances are considered for the modeling the target system, including, for example, (i) the perturbation of the resource allocations that occurs on input to the resource consumer and (ii) and the distortion of the system outputs. More specifically, FIG. 2 depicts input disturbances $d_1^I(k), \ldots d_N^I(k)$ (e.g., due to workload changes or contention with administrative tasks, or the constraint upon the control inputs such as the fixed total memory size and the minimum size requirement for each memory pool to avoid database operation failures) that are added (23) to respective control inputs $u_1(k), \ldots, u_N(k)$ (resource allocations), and the distortion $d_1^O(k), \ldots d_N^O(k)$ (e.g., stochastic disturbance, noise, measurement bias, etc.) that is added (24) to the system outputs $y_1(k), \ldots, y_N(k)$ of the respective resource consumers (22). For purposes of modeling the target system, the measured outputs are $w_1(k), \ldots, w_N(k)$ (i.e., the response time benefit for each resource consumer), wherein the measured output for the i-th resource consumer is $w_i(k) = y_i(k) + d_i^O(k)$.

The system (20) further comprises an aggregator (25) that determines the average measured output (average benefit), $\overline{w}(k)$, from all consumers, where $$\overline{w}(k) = \frac{1}{N} \sum_i w_{i=1}^N(k).$$

In the exemplary embodiment, $\overline{w}(k)=[w_1(k) \ldots w_N(k)]1/N1_{N,1}$, wherein $1_{N,1}$ is a vector of N 1's. The average measured output $\overline{w}(k)$ is a control reference that is fed back to the load balancer (21) to determine if the loads are balanced or not. More specifically, the respective measured outputs $w_1(k), \ldots, w_N(k)$ and average measured output $\overline{w}(k)$ are input to an error determiner (26) to determine respective control errors, $e_1(k), \ldots, e_N(k)$, as the difference between the measured output $w_1(k), \ldots, w_N(k)$ and the average $\overline{w}(k)$. In other words, the i-th control error at time k is $e_i(k)=\overline{w}(k)-w_i(k)$, where it is to be noted that $$\sum_{i=1}^N e_i(k) = 0.$$

In the exemplary control system of FIG. 2, the control objective is to make the error $e_i(k)$ zero, i.e., balancing the measured outputs so as to maximize the total saved response time, which can be expressed as:

$$\frac{df_i}{du_i} - \frac{1}{N} \sum_{j=1}^N \frac{df_j}{du_j} = 0,$$

for the i-th resource consumer.

More generally, the measured output and the average can be weighted to reflect the different importance for the different resource consumers, such as follows:

$$w_i\left(\frac{df_i}{du_i}\right) - \frac{1}{N} \sum_{j=1}^N w_j\left(\frac{df_j}{du_j}\right) = 0,$$

where $w_i$ is the weight for the i-th resource consumer.

It is to be appreciated that in the exemplary control scheme of FIG. 2, rather than using a static value or external signal as the control reference (which is typically done in control engineering and practice), the control reference $\overline{w}(k)$ is specified as a linear transformation of measured outputs, which enables a novel application for using control theory for solving a nonlinear constrained optimization problem.

As noted above, the exemplary embodiment of FIG. 2 depicts a feedback control system in which a MIMO controller acts as a load balancer to control resource allocations for N resource consumers. In a feedback control system such as depicted in FIG. 2, the system outputs $w_i(k)$ are fed back and compared with the control reference $\overline{w}(k)$ and the controller (21) generates the control signals $u_i(k)$ based on the respective errors, $e_i(k)$. The resource consumers (22) are driven to reduce the error (i.e., negative feedback). The closed loop negative feedback control of the control system provides a mechanism to counter the effects of the disturbances.

In accordance with the invention, a MIMO control system such as depicted in FIG. 2 can be constructed based on the estimated parameters of the dynamic system model using any suitable control strategy known to those of ordinary skill in the art for optimizing system resource allocations in a manner that considers disturbances (e.g., changes in workload) and costs of control (e.g., costs of transient load imbalances and changing resource allocations). For example, in one exemplary embodiment of the invention, a MIMO controller can be designed as a dynamic state feedback controller using a state space model of the plant (wherein the state space model parameters of the plant are obtained via system identification as discussed above), and specifying a state feedback controller using a known controller type for augmenting the system state and defining the state space of the closed loop system.

In one exemplary embodiment of the invention, the known "integral controller" control strategy is used for generating the control signals from the respective error signals in the feedback system, wherein the integral controller considers the error history up to the current time for generating the control signals. More specifically, a state feedback integral controller can be defined as $u(k)=Ke_I(k)$, where $u(k)$ is a vector representing the control input, where $e_I(k)$ is a vector representing the sum of the control error (wherein subscript I denotes that in continuous time $e_I$ is computed as an integral), and wherein K is a vector of feedback gain having elements that represent the individual control gains in the feedback control system.

In accordance with the present invention, the MIMO controller is designed using known methods for determining the control gain K in a way that considers the cost of control including the cost transient load imbalances and the cost of changes in resource allocation. In one exemplary embodiment, the feedback control gain K for the MIMO controller can be determined using the known LQR (Linear Quadratic Regulator) design method that iterates on elements in a cost function J (which includes control errors, the integral of errors, and the control inputs) to determine a feedback gain K matrix that minimizes J in a manner that achieves some compromise between the costs of control. A method for quantifying the cost of control (populating the Q and R matrices) using LQR in a manner that is practical for system implementation, will be described in detail below.

It is to be appreciated that other methods can be used for determining the feedback gain K. For example, in another exemplary embodiment, the pole placement design method can be used for choosing control gains in the MIMO controller where the desired poles are specified to balance the desired transient performance and the required control energy for moving the poles. In all such instances, the controller parameters can be used to define the control law in accordance with the chosen control strategy (e.g., integral control, proportional control, differential control, proportional integral control, etc.)

It is to be understood that the exemplary embodiment of FIG. 2 depicts a general control framework that can be implemented for controlling allocations of various types of system resources (such as memory, CPU, disk, or load resources such as customer requests) for various types of consumers of such resources. For example, for database memory resource management as discussed herein, the resource consumers (22) may comprise memory pools such as buffer pools for caching data and index pages, wherein the control inputs $u_1(k), \ldots, u_N(k)$ specify memory allocations and the system outputs $y_1(k), \ldots, y_N(k)$ are the response time benefit obtained as a result of the changed memory allocation. Further, for a server farm system, the resource may be web requests, the resource consumers are web servers, and the system output is server utilization. Depending on the application, the system outputs will be one or more performance metrics that can quantify, and be representative of, system performance. In general, such performance metrics can include end-user response times, response times on the server, throughput, utilizations of various resources on the server, or any other performance metric that is sufficiently measurable. The system inputs (control inputs) that are selected are those that affect the selected performance metrics in a meaningful way. In short, the control inputs and system outputs will vary depending on the computing system and resource type, as well as other factors that are considered for modeling the target system using system identification techniques.

Figure 3:
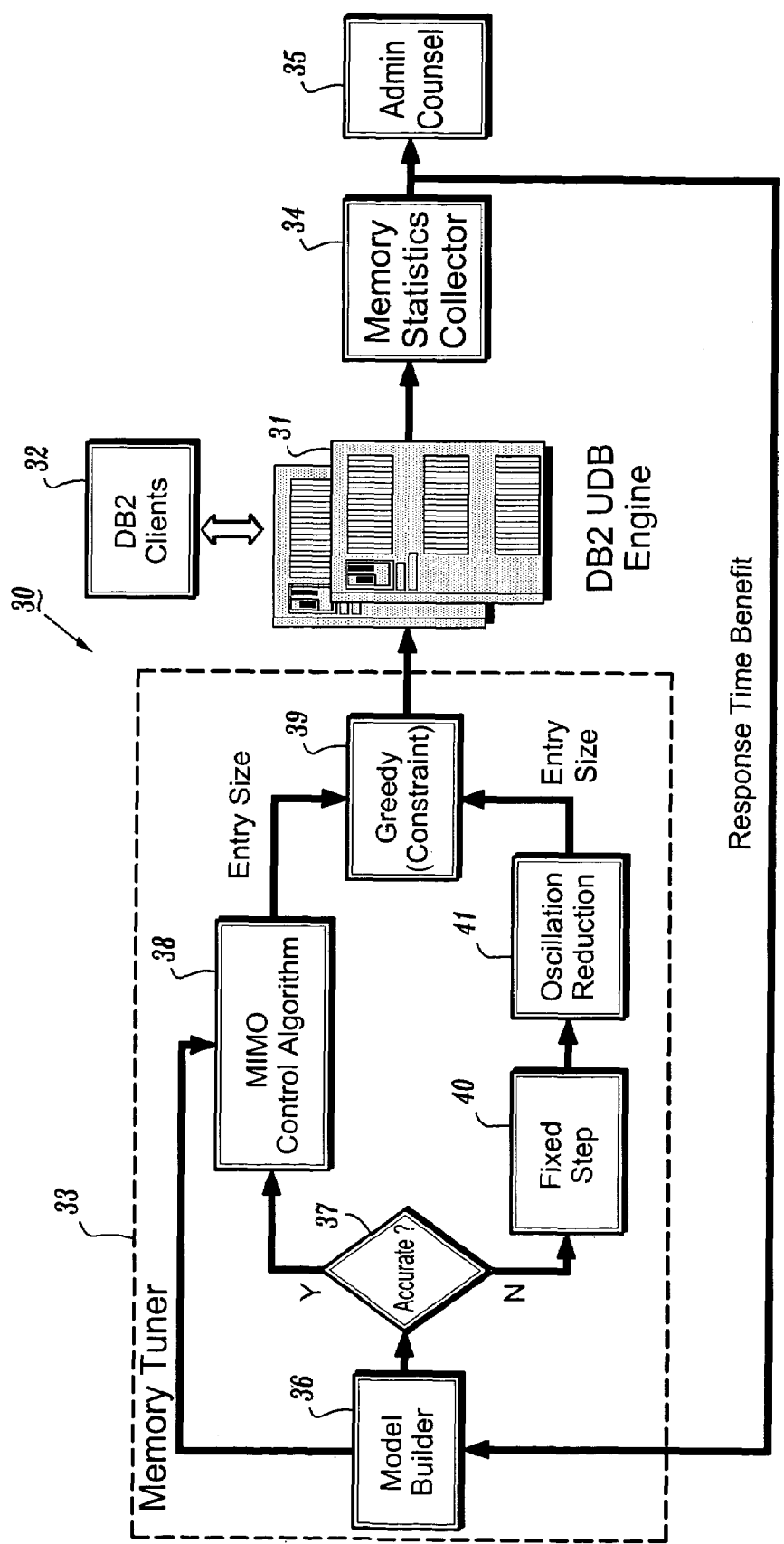
FIG. 3 is a schematic block diagram of a dynamic data processing system that implements a control system for optimizing the performance and/or utilization of constrained resources, according to another exemplary embodiment of the invention.

FIG. 3 is a schematic block diagram of a dynamic data processing system that implements a control system for on-line optimizing the performance and/or utilization of constrained resources according to another exemplary embodiment of the invention. More specifically, FIG. 3 depicts a database server system (30) comprising a database engine (31) which serves a plurality of database clients (32) and which controls access to data (pages) stored in a plurality of memory pools and disks associated with the database server system (30). The system (30) is similar to the system (10) of FIG. 1 in that the system comprises a memory tuner (33) that operates based on performance metric values (e.g., response time benefits) that are reported by a memory statistics collector (34) for the different memory pools. The memory tuner (33) uses the reported response time benefit statistics to determine the change in memory allocation, if any, for each memory pool and generate the necessary control inputs. The system (30) further comprises an administrative monitoring system (35) that receives analyzed statistics provided by the memory statistics collector (34) for monitoring system performance of the memory tuner (33).

FIG. 3 depicts an exemplary embodiment of a memory tuner (33) that implements a dual control architecture comprising: (i) an adaptive (self-tuning) regulatory control system that is based on, for example, a model-based linear regulatory control scheme (such as explained above with reference to FIG. 2), which enables on-line (run-time) modeling of a target system (plant) and system model validation for adapting to workload variations; and (ii) a default heuristic control scheme (e.g., fixed step/greedy control), which executes during initial run-time of the system (30) before a system model is built and validated, or at any other time when the model-based control scheme is not active. The memory tuner (33) comprises a model builder module (36), a model validity (accuracy) module (37), a MIMO controller (38), a greedy controller (39), a fixed step module (40), and an oscillation reduction module (41), to implement a dual-control framework for providing constrained optimization of memory resource allocations.

More specifically, the model builder (36), the model validity module (37), the MIMO controller (38) and the greedy controller (39) are components of the memory tuner (33) that provide a model-based adaptive regulatory control scheme for online constrained optimization of database memory resource allocation. In particular, in the exemplary database memory management embodiment, the model builder (36) automatically constructs a dynamic system model of the target system (plurality of memory resource consumers) during run-time of the system (30) using response time benefit data provided by the memory statistics collector (34). For example, the model builder (36) may implement a system identification method to construct a linear model of the plant dynamics, which assumes a local linear relationship between the system inputs (memory size allocations) and the system outputs (benefit value) for the memory consumers. The system model parameters are used for determining the controller parameters for the control process implemented by the MIMO controller (38).

In addition, for purposes of adaptive (self-tuning) control, the model builder (36) continually constructs/optimizes the system model during runtime of the system (30) to adapt to variations in the plant dynamics and workload changes during run-time of the system (30). The adaptive control process enables redesign and adaptation of the controller parameters to render the model-based controller adaptive to changing dynamics and conditions of the target system. An exemplary method for building a dynamic system model according to the invention will be described by way of example with reference to the flow diagram of FIG. 5

The model validity module (37) evaluates the accuracy, or otherwise checks the validity, of the dynamic system model, on a periodic basis, as the model is being built during initial run-time, and after the model is implemented during run-time. The model validity module (37) evaluates a plurality of conditions to determine whether a given model implementation is valid at a current time. A method for evaluating the accuracy of a dynamic system model according to an exemplary embodiment of the invention will be discussed below with reference to the exemplary flow diagram of FIG. 6, for example.

When the quality of the dynamic system model is verified (the model is deemed accurate to support model-based decision making), the dynamic system model parameters will be used for generating the controller parameters for the control process implemented by the MIMO controller (38). In particular, the model validity is checked during construction and when the model quality is verified, the model validity module (37) will active the MIMO control module (38). When activated, the MIMO control module (38) will use the system model parameters (provided by the model builder (36)) to determine the control parameters to implement the control law for computing control actions. In one exemplary embodiment of the invention, the MIMO control process (38) implements an integral control strategy to determine the proper tuning actions required to resize the memory resource consumers to equalize the benefits for all memory consumers.

The MIMO control process (38) outputs an "entry size" or "step size" information for each memory resource consumer, which specify an amount of increase/decrease, if any, for each memory resource consumer. Since the system (30) is subject to the constraint of a fixed total available memory, the greedy controller (39) will generate the control inputs to the database engine (31) in accordance with the "step sizes" specified by the MIMO control process (38) but in a manner that enforces the constraint to ensure the total memory is unchanged. Details regarding an exemplary greedy control process will be described below.

The fixed step module (40), oscillation reduction module (41) and the greedy controller (39) are components of the memory tuner (33) that implement the default heuristic tuning control scheme for online constrained optimization of database memory resource allocation, when a MIMO model is not available (e.g., before the first model can be constructed). In particular, when the dynamic system model is determined to be not accurate, which is often the case in the initialization phase where not enough data have been collected, the model validity module (37) will trigger the activation of the fixed step module (40) to provide a default heuristic/greedy tuning method wherein the "entry size" or "step size" is fixed such that the size of each memory pool increases or decreases with a specified fixed step size. The fixed step module (40) resizes the memory of a given memory consumer in fixed increments based only on the size of the consumer and the total tunable memory size in accordance with the greedy control constraint, regardless of the benefit value (e.g., increase in memory of 10%). In one exemplary embodiment, the fixed step module (40) provides a means for specifying a parameter for the fixed "entry size", which is determined based on the total size of the memory pools.

With fixed size tuning, however, the system can at times, oscillate between two "good" states in an attempt to find the "best" state. The oscillation reduction module (41) implements an oscillation avoidance method to reduce the fixed step memory tuning size when oscillating patterns are observed. The oscillation reduction module (41) analyzes a knowledge base, or history, of tuning (memory size increases/decreases) which is maintained for each memory consumer to identify potential oscillation patterns that can occur when the memory size allocation reaches a near optimal state using the default scheme. The oscillation reduction module (41) will reduce the fixed step size for a given consumer to find an optimal steady state condition.

In the exemplary system (30) of FIG. 3, the default heuristic controller and model-based MIMO controller will determine the magnitude of the "entry size" (memory resize) (i.e., the amount of memory increase or decrease), if any, for each memory consumer. Once the magnitude has been determined, the greedy controller (39) implements methods to redistribute the memory of the memory pools in a manner that ensures that the total memory remains fixed. For example, the greedy controller (39) will resize the resource consumers (memory pools) in pairs, i.e., decreasing memory from one consumer and increasing memory for another consumer by the same amount based on the entry size information received by the active controlling scheme. The greedy controller (39) has knowledge of the benefit values for each of the memory pools, and uses the computed benefit values to determine the memory pools with the highest benefit values and those with the smallest benefit values. The greedy controller (39) will take memory greedily from the memory consumer that is least in need of memory (lowest benefit value) and give such memory to the memory consumer that is most in need of memory (highest benefit value).

More specifically, in one exemplary embodiment, the greedy process implements the methods described in U.S. patent application Ser. No. 10/391,686, filed on Mar. 19, 2003, entitled: System and Method for Autonomically Reallocating Memory Among Buffer Pools, which is commonly assigned and fully incorporated by reference herein. Briefly, an exemplary greedy control process such as described in the above-incorporated patent application operates as follows. First, the memory consumers are separated into to two groups according to whether or not their benefit is larger than the average benefit, and then the memory consumers are sorted based on their expected benefit if their benefit is larger than the average benefit and based on their expected cost if their benefit is smaller than the average benefit. From the computed size change of the MIMO algorithm or heuristic tuning limit (described in detail below), pages are taken from the memory consumer with a smaller than average benefit and lowest expected cost and the pages are given to the memory consumer with a larger than average benefit and the highest expected benefit provided that the benefit of the recipient is greater than the cost of the donor (at this point, no resizing of the consumers occurs, but the new sizes for each consumer are recorded). When the computed size change or limit is reached so that the memory consumer with highest expected benefit can grow no larger, pages begin to be added to the memory consumer with the next highest expected benefit. Conversely, when the memory consumer with the lowest expected cost can shrink no more, pages are taken from the memory consumer with the next lowest cost. This process of trading memory is continued until all allowable memory transfers are logically performed. At this point, the new sizes for each of the consumers are known, and the consumers are physically resized starting with all consumers that are decreasing and then all consumers that are increasing are resized.

Figure 4:
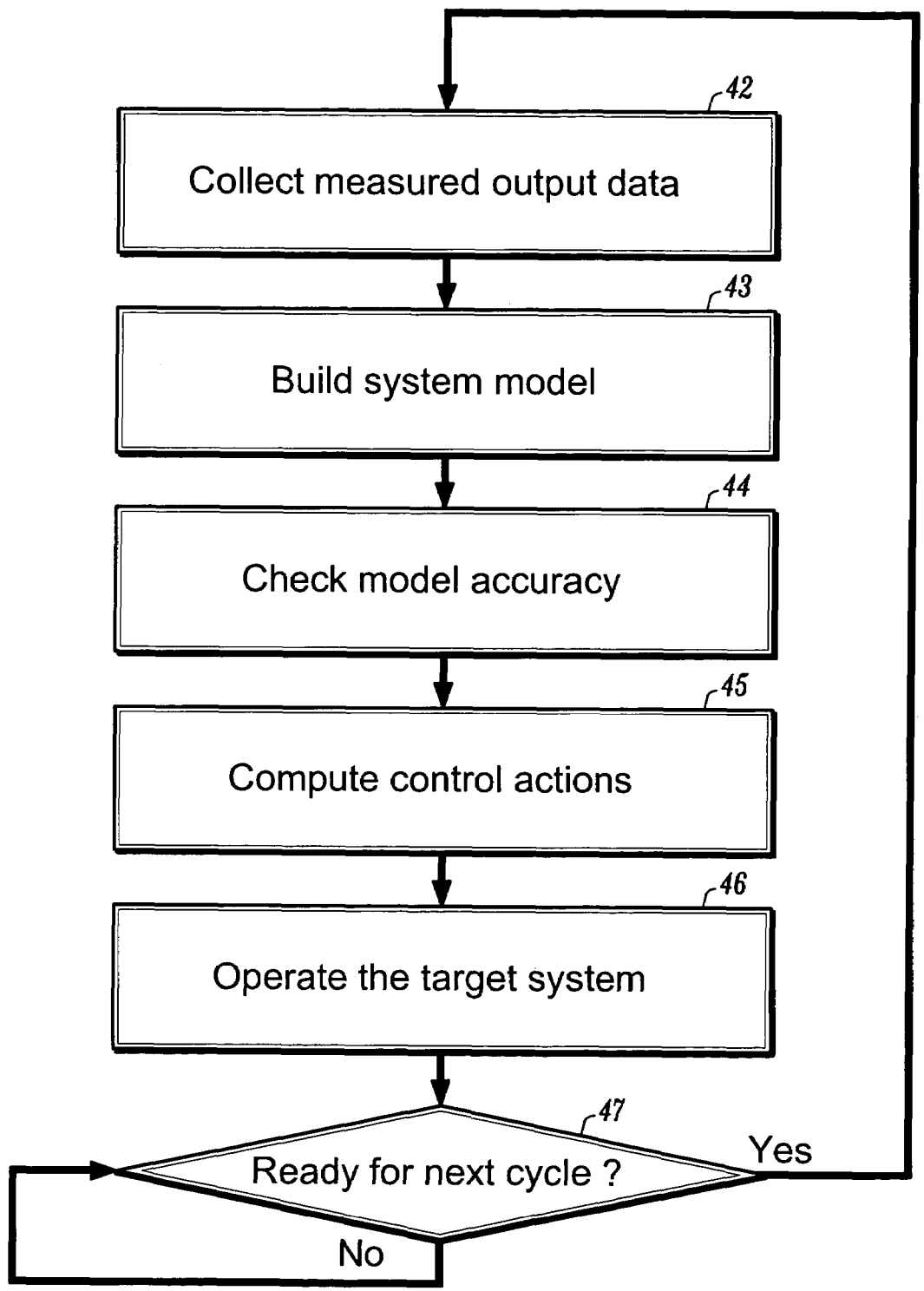
FIG. 4 is a flow diagram that illustrates a method for providing constrained optimization using adaptive linear regulatory control according to an exemplary embodiment of the invention.

FIG. 4 is a flow diagram that illustrates a method for managing computing resources in a dynamic computing system according to an exemplary embodiment of the invention. More specifically, FIG. 4 is a flow diagram of a control method for providing constrained optimization using adaptive linear regulatory control according to an exemplary embodiment of the invention. The method of FIG. 4 can be viewed as an exemplary mode of operation of the memory tuner (33) of FIG. 3. As such, for illustrative purposes, the method of FIG. 4 will be discussed with reference to the exemplary embodiment of FIG. 3. During run-time of the database server system (30), the system output data (system performance metrics, such as response time benefit) for each memory resource consumer (e.g., memory pool) is measured and collected (step 42). As noted above, the memory statistics collector (34) reports performance metric values to the model builder (36).

The system output data is used by the model builder process (36) to build a dynamic system model (step 43). As noted above, the well-known system identification method can be used for building a linear system model (e.g., MIMO model) based on the control inputs (memory resource allocations) and corresponding system outputs of the target system. One exemplary method for implementing the model building process (step 43) will be discussed in detail below with reference to FIG. 5.

After the system model is constructed, the model accuracy will be verified (step 44) and depending on the verification results, control actions will be computed (step 45) for changing memory resource allocations using either the default heuristic control scheme or a model-based adaptive regulatory control scheme. The control actions are executed to operate the target system (step 46). Exemplary methods for implementing steps 44 and 45 will be described below with reference to FIGS. 6 and 7, respectively. Since the memory tuning is a continual optimization process, the method is repeated after a fixed cycle time (affirmative result in step 47). The control tuning cycle of the memory tuner (30) can be set to any suitable time, such as every one minute.

Figure 5:
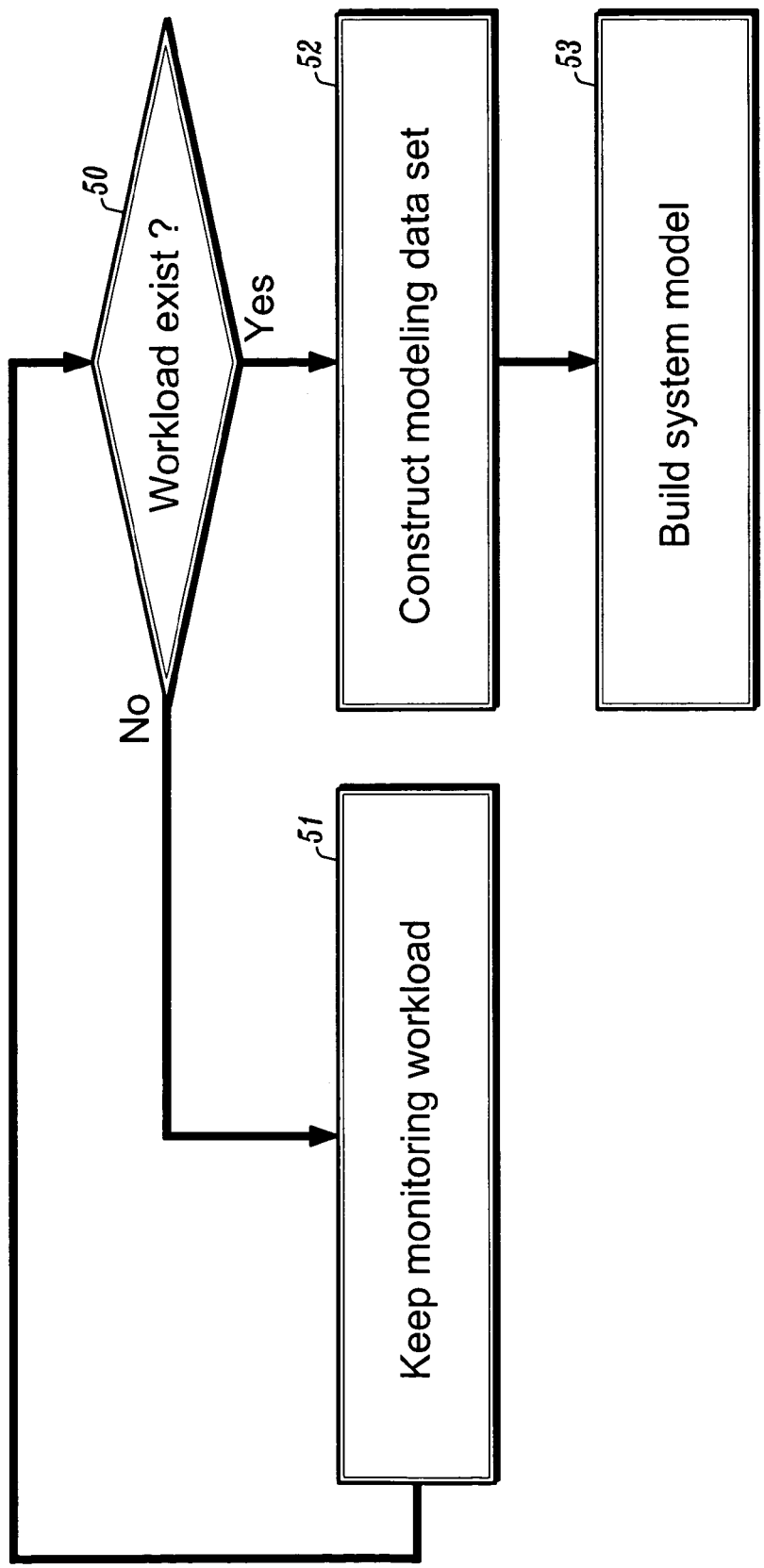
FIG. 5 is a flow diagram illustrating method for building a dynamic system model according to an exemplary embodiment of the invention.

FIG. 5 is a flow diagram illustrating a method for building a dynamic system model according to an exemplary embodiment of the invention. In the exemplary method of FIG. 5, it is assumed that the database server system (30) is operating in an initialization phase in which the default heuristic/greedy control scheme is currently implemented. During this time, the workload is monitored to collect data pairs of resource allocations (changes in memory consumer size) and expected benefit for each memory resource consumer (step 50). If sufficient workload does not exist (negative determination in step 50), the workload will continue to be monitored (step 51).

If sufficient workload is determined to exist (affirmative determination in step 50) (i.e., sufficient data has been collected), the model building process continues with constructing a modeling data set using the collected data (step 52) and building the system model based on the modeling data set (step 53). More specifically, in one exemplary embodiment, the modeling data set is determined by calculating a slope (benefit_slope) of a memory benefit curve, which is generated for each memory resource consumer using the respective data that is collected for the memory resource consumers. More specifically, the benefit_slope for a given memory resource consumer is determined by fitting a line to the historic data that is collected for memory consumer, which historic data comprises data pairs of memory consumer size and expected benefit value. A curve fitting process is performed using the batch least squares method, which is a known statistical regression technique.

More specifically, in one exemplary embodiment, a local linear relationship (linear model) is assumed between the i-th memory consumer size ($size_i$) and its benefit ($benefit_i$) at time interval k, as follows:

$$benefit_i(k) = benefit\_slope_i(k) \times size_i(k) + offset_i(k),$$

which is model for linearly modeling the relationship between resource allocations ($size_i(k)$) and the measured output ($benefit_i(k)$) for the i-th resource consumer (memory pool), wherein the $benefit\_slope_i(k)$ is a model parameter that is determined using a method described hereafter. It is to be noted that the benefit_slope is negative since the larger the memory size of the memory resource consumer, the smaller the benefit (saved system seconds/page).

The modeling data is collected over a moving window of length n intervals. Before the benefit_slope value is computed, the sample mean of the memory pool size is determined as:

$$mean\_size_i(k) = \frac{1}{n} \sum_{j=k-n+1}^{k} size_i(j).$$

Then the sample mean of the benefit is determined as:

$$mean\_benefit_i(k) = \frac{1}{n} \sum_{j=k-n+1}^{k} benefit_i(j).$$

The benefit_slope is a model parameter that can be determined using the following least squares regression equation:

$$benefit\_slope_i(k) = \frac{\sum_{j=k-n+1}^{k}(size_i(j) - mean\_size_i(k))(benefit_i(j) - mean\_benefit_i(k))}{\sum_{j=k-n+1}^{k}(size_i(j) - mean\_size_i(k))^2}$$

which generates a best fit to the data in the moving window.

The first set of modeling data (the first n intervals) is obtained based on data collected while the default heuristic fixed step tuning controller is active. After this data is used to build the initial system model, assuming the system model is validated (FIG. 6), the system model is used to build and deploy a MIMO controller, whereby further tuning is performed by the MIMO controller. Further, for purposes of adaptive (self-tuning) control, the benefit_slope may vary over time with workload fluctuations and consequently, the system model is rebuilt frequently to maintain accuracy of the system model over potentially changing workloads and adapting the MIMO controller accordingly.

Figure 6:
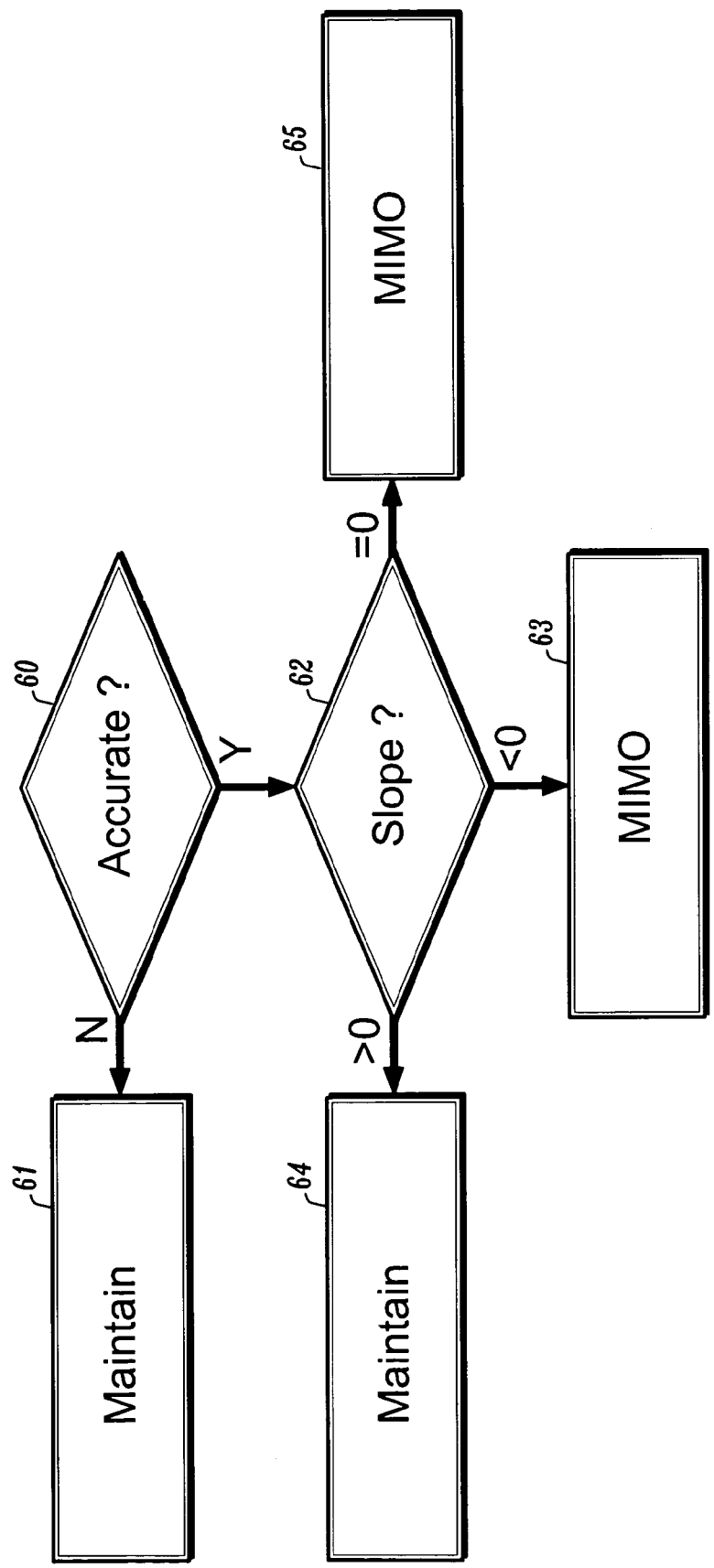
FIG. 6 is a flow diagram illustrating a method for validating a dynamic system model according to an exemplary embodiment of the invention.

FIG. 6 is a flow diagram that illustrates a method for verifying the accuracy of a system model according to an exemplary embodiment of the invention. FIG. 6 illustrates a method that can be implemented for the check model accuracy process (step 44) in FIG. 4. In general, after the benefit_slope value is calculated for each memory resource consumer, the accuracy of the benefit_slope values will be verified before the model is implemented to generate the integral controller. In one exemplary embodiment, the accuracy is determined by examining the benefit_slope values for each memory resource consumer by performing the tests depicted in FIG. 6.

Referring to FIG. 6, an initial determination is made as to whether the model is accurate (step 60). More specifically, in one exemplary embodiment, a model is deemed valid (in step 60) if the model passes the null hypothesis test—the memory size is varying relatively largely so that the relationship between the memory size and benefit is shown through the collected data (i.e., the variation in the benefit data is caused by variation in the memory consumer size, but not due to randomness). The null hypothesis test is a known standard statistical testing method using a method called F-test. In another exemplary embodiment, a model is deemed valid if the range of the variation in the memory size is larger that 20% of the average size, which provides a heuristic approach for validating the model accuracy.

If the model is not accurate (negative determination in step 60) (e.g., the model is null), the newly built model will not be used and the memory tuner will maintain using the controller scheme implemented in the previous mode (step 61), which is either the heuristic tuning or a MIMO controller with a previously obtained, verified model). On the other hand, if the model is deemed accurate (affirmative determination in step 60) (i.e., the model is not null), a determination is made as to the sign of the calculated slope (step 62).

If the slope is determined to be negative (<0), the model will be accepted (step 63). A negative slope value is deemed to be acceptable because as noted above, when the memory for a given memory resource consumer increases, the benefit should decrease. In such case the model will be used to build/adapt a MIMO controller. If the slope is determined (in step 62) to be positive (>0), the model is deemed unacceptable (although the data may be accurate) and a previously implemented control scheme is maintained (step 64), which is either a MIMO control scheme with a previously constructed MIMO controller, or if a MIMO controller has yet to be constructed, then the default heuristic tuning process is maintained active.

If the slope is determined (in step 62) to be equal to 0, the model will be deemed acceptable (step 65) and the model will be used in build the MIMO controller. More specifically, a model having a benefit_slope=0 is deemed acceptable because a zero slope indicates that either the memory consumer is not being used or that the memory consumer is being used but the data suggests that adding additional memory will not provide a benefit. In one exemplary embodiment of the invention, when a memory consumer is determined to have a zero slope, a very small negative slope will be assigned instead of using the zero slope, which causes memory to be aggressively taken from the memory resource consumer provided that the cost to do so is relatively small.

It is assumed that the system being tuned is memory constrained. This means that even if the memory tuner places the system in a final and optimal state, one or more of the memory consumers will still benefit from additional memory. Therefore, in the middle of tuning, if a given consumer happens to have an optimal amount of memory from its own view, from the global view, such consumer may have too much memory. As a result, in this case, some memory should be taken away from the consumer. Generally, considering the stochastics, the slope of a given consumer will not be exactly zero. If it is exactly zero, this means that the consumer really has too much memory from a global perspective, so some memory should be taken away from the consumer, up to a maximum limit (e.g., 50%).

Figure 7:
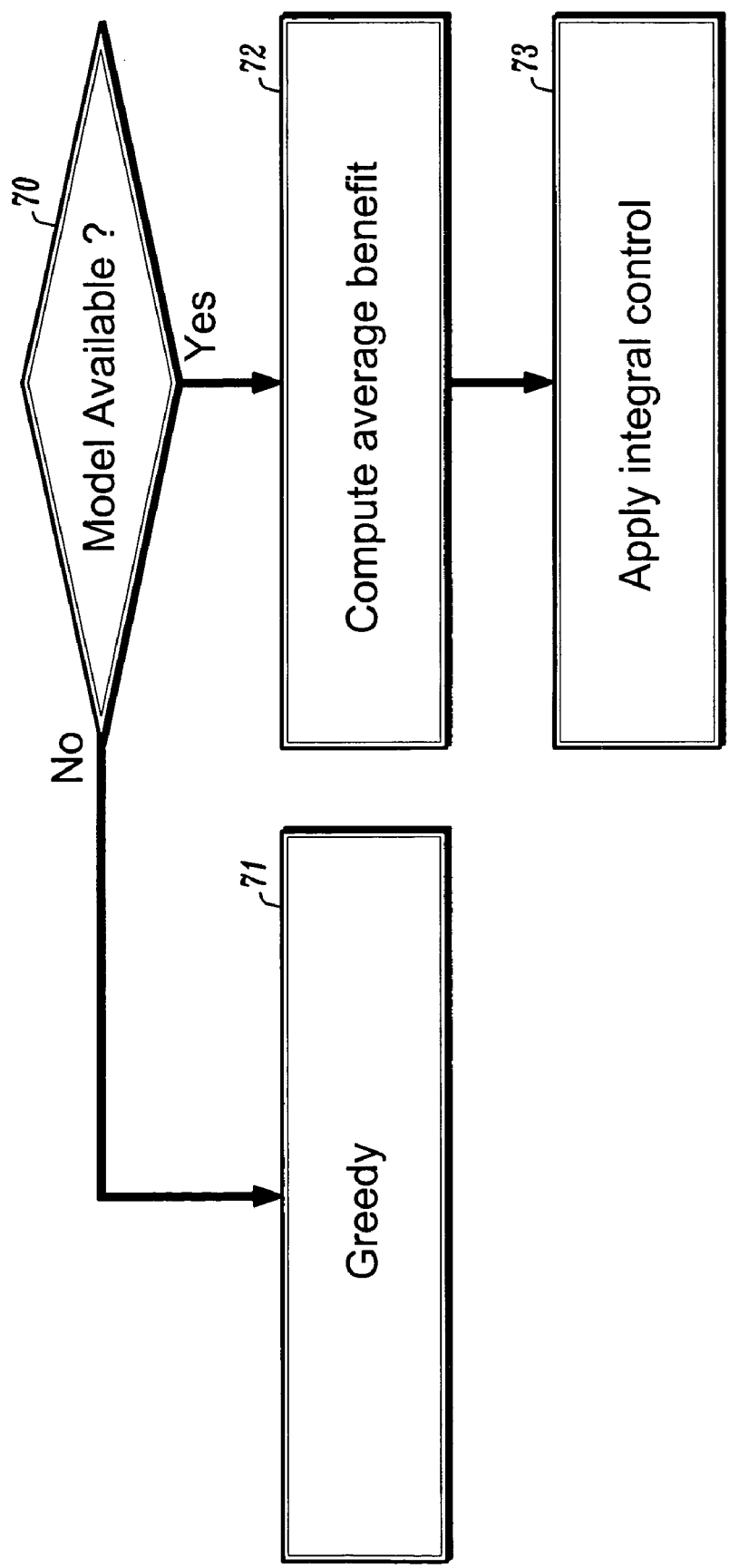
FIG. 7 is a flow diagram illustrating a method for computing control actions according to an exemplary embodiment of the invention.

FIG. 7 is a flow diagram illustrating a method for computing control actions according to an exemplary embodiment of the invention. More specifically, FIG. 7 illustrates a method for implementing step 45 of FIG. 4. Referring to FIG. 7, an initial determination is made as to whether a valid dynamic system model is available (step 70). If a currently valid model is not available (negative determination in step 70), the default heuristic greedy control scheme will be used for computing control actions for resizing existing memory consumers (step 71). On the other hand, when a currently valid model is available (affirmative determination in step 70), a model-based adaptive regulatory control scheme will be used for computing control actions to resize existing memory consumers.

More specifically, by way of example with reference to the system (30) of FIG. 3, when a model is deemed valid, the system model parameters are used for determining the controller parameters for the control process implemented by the MIMO controller (38). In one exemplary embodiment of the invention, the MIMO controller ((38) implements an integral control strategy whereby the model parameters are applied to integral control law to determine how to resize the existing memory consumers. Typically, the integral control law is used to regulate the measured output to a desired reference value. However, for the exemplary memory tuning problem, the reference value for negative feedback control does not exist because there is no a priori knowledge of what the benefit value should be when the system is in the optimal state.

Instead, as explained above with reference to the exemplary embodiment of FIG. 2, an average_benefit of the N memory consumers is determined (step 72) as follows:

$$\text{average\_benefit}(k) = \frac{1}{N} \sum_{i=1}^{N} \text{benefit}_i(k).$$

Furthermore, the measured output (error) for a given memory consumer is determined as:

$$\text{benefit}_i(k) - \text{average\_benefit}(k).$$

The reference value is set to be 0, which would equalize the benefits from all memory consumers and thus maximize the total saved system time.

Then, to size the memory consumers, the integral control law uses the following two equations for the i-th consumer:

$$gain_i(k) = \frac{(p-1)}{\text{benefit\_slope}_i(k)} \quad \text{(i)}$$

$$size_i(k) = size_i(k-1) + gain_i(k) * (benefit_i(k) - \text{average\_benefit}(k)). \quad \text{(ii)}$$

The first equation (i) computes the control gain that will be used in the second equation (ii). The value p is a constant (between 0 and 1) chosen at design time and specifies the desired convergence time in intervals. For example, p can have a value of 0.8, which specifies a convergence time of 20 intervals. In one exemplary embodiment of the invention, the value p is a controller parameter that is derived using LQR to consider the costs of control (i.e., the value of p is determined from the Q and R matrices that are populated as result of minimizing the a cost function as discussed herein).

The gain is then used in the second equation (ii), the integral control law, to compute the new size of the i-th memory consumer (i.e., size(i)). The second equation (ii) takes the benefit of added memory for the i-th memory consumer and compares that with the average_benefit for memory over all of the memory consumers. Since the gain will always be positive, if the benefit for the i-th memory consumer is less than the average_benefit, the size of the i-th memory consumer will decrease. Conversely, if the benefit for the i-th memory consumer is greater than the average_benefit, the size of that memory consumer will increase. Moreover, if the difference between the benefit for the i-th memory consumer and the average_benefit is large, the resizing step will be large. Conversely, if the difference between the benefit for the i-th consumer and the average_benefit is small, the resizing step will be small. This is intuitive and would result in a convergence speed guaranteed by the specified constant p. Additionally, in the steady state when $size_i(k)=size_i(k-1)$, the $benefit_i(k)=$average_benefit(k). This illustrates that at steady state, all benefit values will be equal which achieves the goal of maximizing the total saved system time.

There may be circumstances in which certain memory consumers have been created but are not being utilized. In such instances, their memory sizes can be decreased to a default minimum size. Therefore, the maximum total saved system time can be achieved when the partial derivative for each memory size is equal in the optimal steady state, all the benefit values will be equal except for those from the consumers whose sizes are at the minimum size—their benefit would be smaller. This is also known from the Karush-Kuhn-Tucker conditions.

To compensate the above considerations from the minimum size boundary, the average_benefit can be determined in a more reasonable way as follows. First, a preliminary average benefit is computed from all memory consumers. Then, the actual average benefit is computed from all memory consumers except the ones at the minimum size boundary and having benefits smaller than the preliminary average benefit.

It is to be understood that in the exemplary methods described above (e.g., FIGS. 5, 6 and 7), although the target system (e.g., N memory pools) is described as a MIMO system, the control system can be viewed as a plurality of SISO (single input single output controllers), whereby at any given time, a portion of the N resource consumers having a valid model can be controlled using the exemplary adaptive regulatory controller, and those consumers not having a valid model can be controlled by the default heuristic controller. More specifically, the model building and validation process (FIGS. 5 and 6) can be viewed as being separately applied to each of the resource consumers, whereby the resource allocations for the resource consumers having a valid model (step 70, FIG. 7) are determined and controlled using the integral control process (steps 72, 73), and the resource allocations for the resource consumers not having a valid model (step 70, FIG. 7) are determined and controlled using the default heuristic fixed step control process. In any event, in one exemplary embodiment of the invention, the process of computing the average_benefit (step 72, FIG. 7) for the adaptive regulatory control process will consider the measured benefit all resource consumers, regardless of the active control process for the resource consumers. For instance, even if one resource consumer in the target system is being controlled by the model-based controller at a given time, the average benefit will be determined based on the measured benefit values for all resource consumers.

The following discussion describes a method for designing a MIMO controller (e.g., determining feedback control gains) in a manner that considers the cost of control including both the cost of transient load imbalances and the cost of changes in resource allocations. The former is related to the error e(k) and accumulated error $e_I(k)$. The latter is determined by u(k). One exemplary method for considering these two effects is the linear quadratic regulator (LQR). More specifically, an LQR controller is employed using an exemplary method that minimizes the sum of three costs, the cost of the control error e(k), the cost of the sum of the control error $e_I(k)$, and the cost the control inputs u(k). This optimization is performed over an infinite time horizon.

In particular, in one exemplary embodiment of the invention, a method is provided to quantify the cost of control in a manner that is practically appropriate for the LQR framework, that is, populating the Q and R matrices in the following cost function, J:

$$J = \sum_{k=1}^{\infty} [e'(k)\ e'_I(k)]Q\begin{bmatrix} e(k) \\ e_I(k) \end{bmatrix} + u'(k)Ru(k)$$

The above equation provides a way to handle the tradeoff between the cost of transient load imbalances and the cost of changing resource allocations. Intuitively, if Q is large compared R, the controller will make big changes in resource allocations and hence can react quickly to disturbances. On the other hand, if R is large compared to Q, the controller is much more conservative since there is a high cost for changing resource allocations. A method for constructing the matrices Q and R in a systematic way so that the cost of control is quantified will now be discussed.

Quantifying the cost of control comprises varying the control inputs u(k), which in the exemplary embodiment of load balancing means adjusting the allocation of at least two resources $$\left(\text{since } U = \sum_{i=1}^{N} u_i\right).$$

Let A and B denote two cases of fixed settings of the control inputs. Now consider a third case M in which $$u_{i,M} = \frac{u_{i,A} + u_{i,B}}{2}.$$

Let $T_A$, $T_B$, $T_M$ denote the performance achieved with these settings. Without loss of generality, it is assumed that Case A has better performance than case B, with $T_A < T_B$ (e.g., as in response time metrics). Assuming operation in a linear operating region, then $$T_M = \frac{T_A + T_B}{2}.$$

Thus, if the linearity assumption holds, only experiments for Case A and B have to be conducted.

Now consider Case C in which we oscillate between $u_A$ and $u_B$ so that the long run average value of the control inputs for C are $$u_{i,C} = u_{i,M} = \frac{u_{i,A} + u_{i,B}}{2}.$$

An exemplary method for estimating the cost of control focuses on $$T_C - \frac{T_A + T_B}{2}$$

(which assumes we are in a linear operating region). This makes intuitive sense in that Case C has a nonzero cost for changing resource allocations, whereas this cost is zero for case M. The cost of transient load imbalances is more complex. However, this can be addressed as well by including an appropriate normalization term (which is discussed later).

The cost of control for memory pool management is quantified as follows:

Case A: The memory pool sizes are constant at a setting where the response time benefits are close to each other.

Case B: The memory pool sizes are constant but at a different setting where the response time benefits differ between the memory pools.

Case C: The memory pool sizes oscillate between the sizes in experiments A and B.

Let i index the memory pools and c index the cases above. We define:

$$E_C = \sum_k \sum_{i=1}^{N} e_{i,c}^2(k) \text{ and } V_C = \sum_k \sum_{i=1}^{N} (u_{i,c}(k) - u_{i,c}(k-1))^2,$$

where c is in the set of A, B, C. Ec quantifies the total transient load imbalance across the experiments. Vc quantifies the magnitude of the change in resource allocations.

A model for the cost of control in accordance with an exemplary embodiment of the invention is expressed in terms of the cost per unit change in resource allocation (actually, per squared unit change so that the units are correct), as follows:

$$r = \frac{T_C - (T_A + T_B)/2}{V_C}$$

The numerator estimates the performance degradation due to changes in resource allocations, and the denominator quantifies the magnitude of these changes. In a similar way, the effect of transient load imbalances on performance is quantified as:

$$q = \frac{T_B - T_A}{E_B - E_A}$$

To proceed with specifying the matrices Q and R, two simplifications are made. First, it is assumed that the effect of the control inputs are the same, and there are no interactions between these effects. For the exemplary database memory management system, this means that memory pools affect the performance equally and independently, which gives us R=diag[r, . . . , r]. Second, it is assumed that the control error and the sum of the control error affect performance in the same way, and that these can be considered independent of one another. That is, Q=diag[q, . . . , q]. These assumptions can be eliminated at the expense of making Q and R more complicated. Now, the above quadratic cost is rewritten as:

$$J = q \sum_{k=1}^{\infty} \sum_{i=1}^{N} e_i^2(k) + q \sum_{k=1}^{\infty} \sum_{i=1}^{N} e_{1,i}^2(k) + r \sum_{k=1}^{\infty} \sum_{i=1}^{N} u_i^2(k)$$

It is to be noted that the units of q and the units of r are specified above such that J has the same unit of performance. That is, optimizing J is equivalent to optimizing the system performance including cost of control. The results of the optimization are then converted into a control law in terms of the controller parameters using methods known to those of ordinary skill in the art.

It is to be appreciated that the above LQR process is an off-line process that provides a practical method for empirically determining controller parameters that can be used for defining the control law in a manner that optimizes system performance with respect to control input. For example, as noted above, this process can be used for determining the parameter "p" in the gain equation (i) discussed above with reference to FIG. 7. It is to be further appreciated that the above exemplary LQR process can be a paid for service that can be used for optimizing on-line dynamic computing systems for customers under various contracts, such as a one time service fee, or under a service contract that provides system optimization on a periodic basis, etc.

Although illustrative embodiments have been described herein with reference to the accompanying drawings, it is to be understood that the invention is not limited to the precise system and method embodiments described herein, and that various other changes and modifications may be affected therein by one or ordinary skill in the art without departing form the scope or spirit of the invention. All such changes and modifications are intended to be included within the scope of the invention as defined by the appended claims.

What is claimed is:

1. A method for managing resources in a dynamic computing system, the method comprising:
    measuring a performance metric of a dynamic computing system, wherein the performance metric is representative of system performance obtained for a given allocation of a constrained resource in the dynamic computing system;
    processing the performance metric using an adaptive regulatory control process in which a cost of controlling resource allocation is considered for optimizing the allocation and/or performance of the constrained resource in the dynamic computing system; and
    generating control signals to effect an optimal resource allocation of the constrained resource in the dynamic computing system.

2. The method of claim 1, wherein the constrained resource comprises memory resources.

3. The method of claim 1, wherein processing the performance metric using an adaptive regulatory control process comprises:
    building a system model of a target system using run-time data comprising system metrics that quantify performance of the target system;
    determining controller parameters based on the system model to implement a feedback controller; and
    generating control inputs based on the controller parameters to control the target system.

4. The method of claim 3, wherein building a system model of the target system comprises determining a linear MIMO (multiple input multiple output) model by modeling a relationship between data pairs of control inputs and the system metrics.

5. The method of claim 3, wherein determining controller parameters comprises determining controller gain parameters using LQR (linear quadratic regulation) to implement a MIMO controller.

6. The method of claim 3, wherein determining controller parameters comprises determining controller gain parameters using a pole assignment process to implement a MIMO controller.

7. The method of claim 3, wherein determining controller parameters comprises determining controller gain parameters that consider costs of control including a cost of transient load imbalances and a cost of changing resource allocations.

8. The method of claim 3, further comprising:
    determining if the built system model is valid; and
    if the built system model is deemed not valid, using a heuristic fixed step controller to control the target system, or using an adaptive regulatory control process that is based on a previously built valid system model.

9. The method of claim 1, wherein optimizing comprises allocating a system resource among a plurality of resource consumers of the dynamic computing system to maximize performance of the dynamic computing system subject to the constraint that amount of the resource to be allocated is fixed.

10. The method of claim 9, wherein the plurality of resource consumers comprise memory pools of a database server, wherein a total size of the memory pools is fixed, and wherein optimizing comprises adjusting memory resource allocations to the memory pools to maximize a total disk response time over all the memory pools subject to a constraint that a sum of changes in memory resource allocations over all the memory pools is always 0.

11. A program storage device readable by machine, tangibly embodying a program of instructions executable by the machine to perform method steps for managing computing resources in a dynamic computing environment, the method steps comprising;
measuring a performance metric of a dynamic computing system, wherein the performance metric is representative of system performance obtained for a given allocation of a constrained resource in the dynamic computing system;
processing the performance metric using an adaptive regulatory control process in which a cost of controlling resource allocation is considered for optimizing the allocation and/or performance of the constrained resource in the dynamic computing system; and generating control signals to effect an resource allocation of the constrained resource in the dynamic computing system.

12. The program storage device of claim 11, wherein the constrained resource comprises memory resources.

13. The program storage device of claim 11, wherein the instructions for processing the performance metric using an adaptive regulatory control process comprise instructions for:
building a system model of a target system using run-time data comprising system metrics that quantify performance of the target system;
determining controller parameters based on the system model to implement a feedback controller; and
generating control inputs based on the controller parameters to control the target system.

14. The program storage device of claim 13, wherein the instructions for building a system model of the target system comprise instructions for determining a linear MIMO (multiple input multiple output) model by modeling a relationship between data pairs of control inputs and the system metrics.

15. The program storage device of claim 13, wherein the instructions for determining controller parameters comprise instructions for determining controller gain parameters using LQR (linear quadratic regulation) to implement a MIMO controller.

16. The program storage device of claim 13, wherein the instructions for determining controller parameters comprise instructions for determining controller gain parameters using a pole assignment process to implement a MIMO controller.

17. The program storage device of claim 13, wherein the instructions for determining controller parameters comprise instructions for determining controller gain parameters that consider costs of control including a cost of transient load imbalances and a cost of changing resource allocations.

18. The program storage device of claim 13, further comprising instructions for: determining if the built system model is valid; and if the built system model is deemed not valid, using a heuristic fixed step controller to control the target system or using an adaptive regulatory control process that is based on a previously built valid system model.

19. The program storage device of claim 11, wherein the instructions for optimizing comprise instructions for allocating a system resource among a plurality of resource consumers of the dynamic computing system to maximize performance of the dynamic computing system subject to the constraint that amount of the resource to be allocated is fixed.

20. The program storage device of claim 19, wherein the plurality of resource consumers comprise memory pools of a database server, wherein a total size of the memory pools is fixed, and wherein the instructions for optimizing comprise instructions for adjusting memory resource allocations to the memory pools to maximize a total disk response time over all the memory pools subject to a constraint that a sum of changes in memory resource allocations is always 0.

21. A method for managing resources in a dynamic computing system, comprising:
determining a performance metric value for each of a plurality of resource consumers of a target system;
determining a control reference value as an average of the performance metric values of the resource consumers:
determining a control error for each resource consumer as a difference between the performance metric value of the resource consumer and the control reference value; and
controlling the target system using a control method that optimizes resource allocations for the resource consumers by minimizing the control errors subject to a constraint.

22. The method of claim 21, wherein controlling the target system comprises using a model-based feedback controller to generate control inputs for controlling the resource consumers based on control parameters that are determined based on model parameters of a system model of the target system.

23. The method of claim 22, wherein controlling the target system comprises: determining an optimal resource allocation for each of the resource consumers using the model-based feedback controller; and adjusting the resource allocation of the resource consumers based on the optimal resource allocations subject to the constraint that a total amount of the resource to be allocated among the resource consumers is fixed.

24. The method of claim 22, wherein the model based-feedback controller comprises a MIMO controller that is based on a linear MIMO model of the target system.

25. The method of claim 22, further comprising building the system model of the target system based on runtime values of control inputs and performance metrics that are collected for the resource consumers.

26. The method of claim 25, wherein building the system model comprises building and validating a system model on a continual basis to adapt the controller parameters to variations in dynamics of the target system.

27. The method of claim 22, wherein the controller parameters comprise controller gain parameters that consider costs of control including a cost of transient load imbalances and a cost of changing resource allocations.

28. The method of claim 27, comprising the step of determining the controller gain parameters using LQR.

29. The method of claim 21, wherein the plurality of resource consumers comprise memory pools of a database server, wherein a total size of the memory pools is fixed, and wherein controlling the target system comprises adjusting memory resource allocations to the memory pools to maximize a total disk response time over all the memory pools subject to a constraint that a sum of changes in memory resource allocations over all the memory pools is always 0.

30. A dynamic computing system, comprising:
a system resource; a target system comprising a plurality of resource consumers of the system resource;
a control system to control allocation's of the system resource to the resource consumers using an adaptive regulatory controller that optimizes the resource allocations to the resource consumers subject to a constraint;

wherein the dynamic computing system is a database server comprising disks for storing data, the system resource is memory, and wherein the resource consumers comprise memory pools that cache copies of data stored in the disks;

wherein the performance metric for a given memory pool is a measure of saved disk response time per unit memory increase of the memory pool.

31. The system of claim 30, wherein the constraint is that the amount of the system resource is fixed.

32. The system of claim 31, wherein the control system comprises: a model building process that continually builds a system model of the target system based on run-time input/output data of the target system for implementation by the adaptive regulatory controller; and a model validation process that determines if a system model is valid before implementation by the adaptive regulatory controller.

33. The system of claim 32, wherein the control system comprises a heuristic controller that adjusts resource allocations for the resource consumers in fixed increments subject to the constraint, wherein the control system uses the heuristic controller when there is no valid system model for implementation by the adaptive regulatory controller for model-based control.

34. The system of claim 30, further comprising a statistics collection system that determines a performance metric value for each resource consumer of the target system, wherein the control system optimizes the resource allocations to the resource consumers by equalizing the performance metric values of the resource consumers subject to the constraint that a sum of changes resource allocations to the memory pools is equal to 0.

35. The system of claim 30, wherein the adaptive regulatory controller comprises a model based-feedback controller that is based on a linear MIMO model of the target system.

36. The system of claim 35, wherein the model-based feedback controller is a MIMO LQR controller.

* * * * *